Patented Aug. 23, 1932

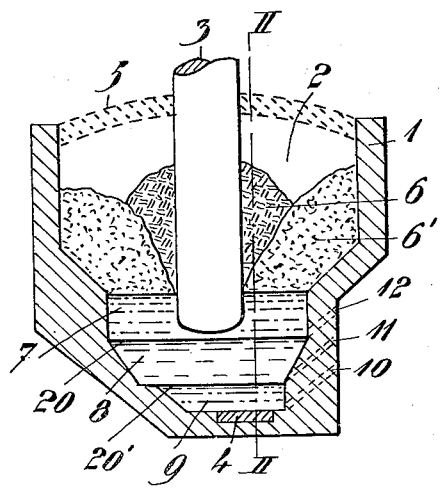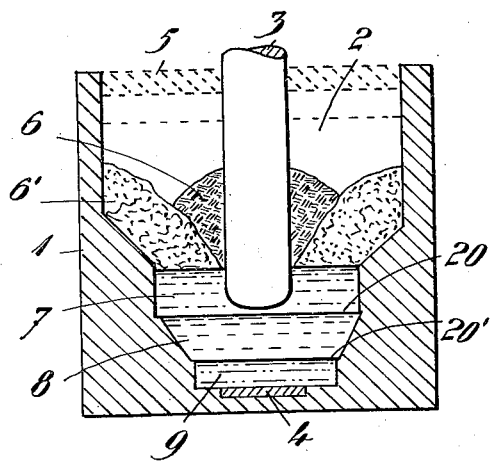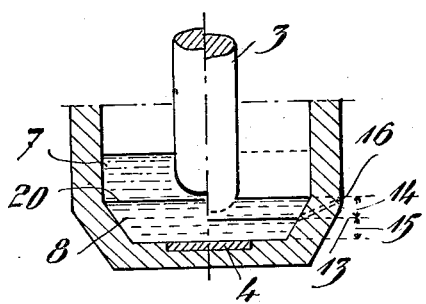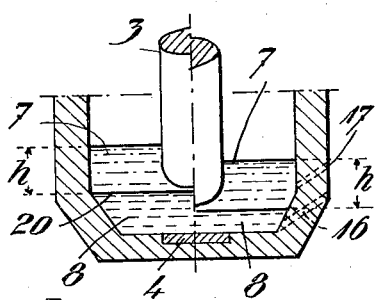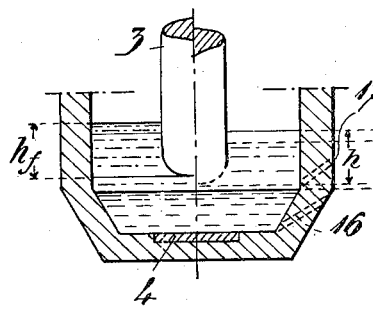

1,873,800

UNITED STATES PATENT OFFICE

AXEL RICHARD WEJNARTH, OF GREDBYVAGEN, ESKILSTUNA, SWEDEN

ELECTROTHERMIC SMELTING OF SULPHIDIFEROUS MATERIALS

Original application filed September 18, 1929, Serial No. 393,593, and in Sweden September 9, 1929. Divided and this application filed November 7, 1930. Serial No. 494,037.

This is a division of my application filed September 18th, 1929, Serial No. 393,593, and priority is claimed for the present application from the date of said application.

In smelting sulphidiferous materials— whether said smelting be carried out with reducing agents or not or with the addition of other substances for forming a slag that may be desired for certain purposes—the different molten products obtained will separate in the furnace depending on the difference between their specific weights, whereby any reduced or separated metal will sink to the bottom. Over said metal a layer of sulphides is formed that may contain more or less of metal and dissolved oxides, over which layer there is formed a layer containing sulphides and oxides, the thickness of which varies with the different conditions, and finally over the last mentioned layer there is formed a layer of oxide slag having a content of oxide or slag that varies according to circumstances.

In smelting in an electric furnace the electric energy is converted into heat thereby that the current lines for a certain voltage pass partly through the charge of raw material, partly through the liquid layer of oxide slag obtained in the smelting and wholly through the underlying layer of metal and sulphide, in case the furnace is provided with top electrodes and bottom electrodes of different voltage, but if only top electrodes of different voltage are used, the current lines will pass only partly through the lower layers. The difference in tension between the poles, which under normal conditions varies between 40–150 volts at a phase-displacement of about 0,90, is dependent on the conductivity of the different substances through which the current lines have to pass, as also on the "electrical effect" or "hook-up" used in the furnace.

Theoretical investigations of the conductivity of the different substances have shown that sulphides, oxides and slags are bad conductors in a solid and cold state, but that their conductivity increases with rising temperature. It has been proved that the conductivity of the sulphides in a molten state at for instance 1300° C., varies between about 200 and 1000 mhos per cubic centimeter, that of the oxides between about 5 and 300, and that of the usually occurring metallurgical slags between about 0,5 and 3. The metals have a conductivity of about 30.000 units and more. The greatest consumption of energy and consequently the greatest development of heat will thus occur in the oxide slag layer, and only a small voltage drop will occur in the sulphide and metal layers on account of the very good conductivity of these latter substances. On account of the concentration of heat in the immediate proximity of the electrodes and the very high temperatures the great voltage drop in the oxide slag layer is causing the substances close to the electrodes to volatilize, the escape of heat being comparatively low. The gases formed and the gases used for the reduction form an electric arc above the oxide slag layer or within the same, depending on the thickness of the layer and the voltage used. It is therefore essential for a satisfactory carrying out of a desired metallurgical process that the oxide slag layer in the furnace is of a certain minimum thickness in order to obtain a desired smelting effect and so as to be able to supply a desired amount of energy, the regulation of which is carried out by raising or lowering the upper electrodes (decreasing or increasing the number of ampere of current at a given voltage).

From the above exposition it will be clear that the electric furnace for smelting different materials in general requires a concentrated construction so that the heat developed can be utilized as well as possible in a desired smelting process, as the energy is transformed into heat substantially within a few zones which are comparatively small in relation to the surface of the furnace. The heat transmission in the furnace thus takes place partly through the physical motions of the underlaying oxide slag layer, whether the electrodes with their arcs are formed over or within the oxide slag layer, partly by mixture of the molten mass flowing down from the charge surrounding the electrodes, and partly by direct radiation and transmission of heat. Therefore for a certain quantity of charge in relation to the amount of energy used the thickness or height of the different layers will be comparatively great, which in addition to the way of transforming electric energy into heat has a very bad influence upon the working of the furnace.

If then the oxide slag bath and the sulphides are tapped off from a common hole placed above the furnace bottom proper, which is the case in the electrothermic zinc furnace, a part of the sulphides will first flow off and thereupon a mixture of sulphides and slag, which latter most often contain parts of the charge not yet metallurgically treated in the process. The quantity of the two materials, sulphide and slag, varies of course with their percentage in the charge, the relative height of the layers and their level above the tap hole and of their relative viscosity. Said layers, which are separated in the furnace, will be mixed when tapped, and the separation that afterwards is undertaken in slag pots or in a hearth cannot be completely carried through before solidification. One must, therefore, later on separate the two layers in a solid state and separate the matter contaminated with slag which must be resmelted for concentration. When tapping the furnace in this way, only a part of the sulphides but almost all of the oxide slag layer is coming out, which latter, as above stated, is the layer which forms the substantial resistance. For this reason the furnace after tapping usually can be loaded only in a comparatively small degree. Every attempt to lower the electrodes, i. e. to increase the strength of current at a given voltage, is causing a heavy overload (short-circuit), because thereby the risk arises that the electrodes come too close to the mixed layer of sulphides and slag or enter it, and possibly also enter into the sulphide layer, the conductivity of said layers being too high.

It is clear that the losses in the production or the working capacity of the furnace, before the furnace by a successively increased load and thereby increased oxide slag layer can be fully loaded economically act very disadvantageously. At a rich separation of metal in the lowest layer in the furnace these disadvantages will be greater, as a corresponding displacement of the upper layers then will take place. The case will be the same when smelting ores or charges containing varying percentage of the components forming said layers in the furnace.

As the heat generation substantially takes place in the oxide slag layer, as above stated, and the voltage drop and the corresponding heat generation or development in the metal and sulphide layers is low, depending on their good conductivity and the great surface the current lines have to pass therein, an increase of the metal or sulphide layers, if not kept within certain limits, will cause the side walls of the furnace to become covered with solidified or viscous material. Hereby the volume of the furnace is decreased and the difficulties in working it increased, besides which the tapping of for instance the metal layer is rendered more difficult. Besides this the relative variations of the different layers in one respect or other will reduce the durability of the furnace, wherefore it often will be necessary to line parts of the furnace with a material which is chemically resistant against said substances. In smelting charges wherein the said components of the different layers vary more or less from time to time the said difficulties will be still worse.

As an account of the concentrated construction of the electric furnace, the thickness of the layers formed is great, a very good separation of the different layers is obtained, as also a distinct separation of the different components in the respective layers, for instance of the different sulphides contained in the sulphide layer on account of their different specific weight, which separation hitherto wholly or partly was lost with the use of the common tapping. Attempts hitherto made to get the different layers out of the furnace without being mixed by tapping them at different levels have never been successful, as it has proved difficult to separate the sulphides and the layer of oxide slag partly because of their different viscosity and partly because of their different chemical effect on the tap holes.

When tapping the sulphides through a hole located lower down on the furnace side, said hole was enlarged by chemical action, and the sulphides, being light-flowing and driven by the pressure in the furnace, rushed out in such quantity that the usual means for closing the furnace, clay balls or the like, were unsuccessful, and the slag would wholly or partly follow the sulphides out. When tapping a metal layer the difficulties are, of course, still greater.

The present invention relates to a process in connection with electrothermic smelting of sulphidiferous material whether previously roasted or not and with or without reducing agents or admixtures of special substances that influence the composition of the slag formed or its conductivity. The process has for its object to so carry out the charging and tapping under consideration of the conductivity of the different substances in the charge or substances formed during the smelting process that the metallurgical process can be carried through in the desired way without making it necessary to periodically run the furnace at a lowered load in any substantial degree.

One object of the present invention is to so carry out the process that the different layers formed can be separately tapped off, whereby a subsequent separation is avoided, which tappings, however, can be undertaken without periodically lowering the effect of the furnace and without disadvantageously affecting the metallurgical process in the furnace.

According to the invention the furnace is tapped through a number of tap holes which are placed at the level of each layer. There may be two or more layers. The tap holes are placed on such levels in relation to said layers that tapping can be carried only so far that the thickness and electric conductivity of the oxide slag layer will maintain at least the minimum thickness and minimum resistance that is necessary for correctly carrying out the metallurgical process and maintaining the load practically unchanged. It is clear that the tapping of a sulphide layer occurring between a lower metal layer and an upper oxide slag layer should not go so far that metals that are intended to be combined with sulphur in an essential degree are able to pass through the sulphide layer without such combination with sulphur taking place. For this reason the tapping hole of the sulphide layer should be placed at such a level that the sulphide layer in relation to the oxide slag layer after the tapping remains at least as thick as required for the fulfillment of the above named conditions.

The tapping should each time be undertaken only in proportion to the quantity that corresponds to the increase of the layer during a certain period and may also as an alternative occur continually. By placing the tapping hole on such a level that never more than a part of the oxide slag layer can be tapped off, a layer of sufficient thickness will always remain in the furnace to ensure that the development of heat necessary for the continued metallurgical process still takes place and that the necessary resistance is maintained for the continued working of the furnace at a satisfactory load.

There is a possibility to so place the top hole that always such a high resistance remains in the furnace after the tappings that the load of the furnace does not need to be lowered at all or only very little during a certain period, and as a lower limit that might occur only at abnormal conditions may be given 50% of the normal load.

In order to prevent too fast a tapping the tapping may, according to the present invention, take place through tap holes or passages so arranged or conducted that a hydraulic counter pressure is generated by the material itself flowing off for instance by conducting the tap holes upwards or inclining upwards a certain distance, either inside or outside the furnace room.

According to the invention the height of the different layers may be enlarged and thus the separation improved by providing the furnace room with a bottom inclined in the direction against the place where the tapping holes are located. In this case a bottom electrode should be provided which is constructed and arranged in such a way that a voltage drop in the layers is obtained that corresponds to such a heat development that the layers will smelt and will be enough lightflowing.

Slag formed during the smelting process may sometimes have too low or too high conductivity for carrying out the process in a satisfactory way. In such cases such substances should, according to the invention, be added which, when entering the slag, raise or lower respectively its conductivity. Theoretical investigations undertaken by me explain the practical experience that the components of the oxide slag bath have a certain influence upon the working of the furnace, but it was not possible to find out which component of a great number of components, in for instance a zinc slag, lead slag, copper slag etc., or slags of nickel and silver bearing ores, which ores are especially adapted to the present process had any influence in one or other direction, i. e. to raise or lower the conductivity of the slag, especially as the above described complications made a survey very difficult. My investigations have proved that the molten silicates of $Al_2O_3$ and of $CaO$, $MgO$, $BaO$, or in general silicates of the light oxides have a low conductivity and comparatively very high melting points, but that silicates of the oxides of Fe, Mn, Ni, Co, Pb, Cu, Au, Ag, or in general silicates of the dark oxides the melting points of which are comparatively very low, have an essentially higher conductivity. The conductivity of a silicate of a dark oxide is about 10–15 times as high as the conductivity of a silicate of a light oxide combined with an equivalent quantity of silicic acid (silicium dioxide). The conductivity of a mixture thereof corresponds to the proportion of the amount of the different substances in question contained in the mixture. Besides these investigations have also proved that the conductivity decreases with increased content of silica. A slag having a low conductivity will cause a stronger concentration of the energy transformed into heat in the neighbourhood of the electrodes than a slag of higher conductivity. Therefore, when smelting charges forming a slag of low conductivity it is possible to supply to the charge such an amount of substances containing iron, manganese, or other such substances that raise the conductivity that the desired metallurgical effect is gained at the same time. This method may be advantageous when smelting charges containing easily volatile oxides or sulphides, as they otherwise escape in proportion to the degree of temperature above the volatilization temperature without being submitted to the desired metallurgical treatment as for instance, to the effect of the added reducing agents and then to the influence of a strongly-reducing, gaseous atmosphere in the furnace compartment. This volatilization causes economical losses, if said vaporized sulphides or oxides are not collected. If they are led away together with other volatile products with or without permanent gases, for instance reduction gases, they are contaminated which will cause increased cost for their refining after separation. In a corresponding way one might add materials containing or forming substances as $SiO_2$, $Al_2O_3$, $CaO$, $MgO$, $BaO$, or other substances which lower the conductivity in such cases where the formed slag otherwise would get too high a conductivity and might prevent a successful culmination of the several metallurgical operations.

The sulphides have a higher conductivity than the oxides and slags, and the oxides have a higher conductivity than the slag, and finally slags of dark oxides have a higher conductivity than slags of light oxides. According to the invention this circumstance is utilized in certain cases in such a way that substances of comparatively good conductivity are charged farther away from the electrodes and closer to the furnace walls, and the substances of lower conductivity are charged nearer or close to the electrodes. Thus when smelting a strongly sulphidiferous material that is, sulphides of copper, lead, zinc, nickel, silver or similar ores, one might charge this material closer to the furnace walls and charge oxide and slag forming substances of lower conductivity so as to cause it to fall or lie nearer to the electrodes. In case the material is less sulphidiferous but more oxide and slag forming, it may be so charged as to cause it to fall or lie nearer to the electrodes, whereas oxide material of higher conductivity such as copper, lead, zinc, silver, nickel or similar ores, is charged farther from the electrodes (closer to the furnace walls).

As an example of the advantage the following fact is pointed out.

In charging material rather rich in sulphur in the afore mentioned way adjacent the furnace walls the sulphides will undergo the desired metallurgical treatment, and sink as they continuously approach the hot zones in the proximity of the electrodes and also through the action of the circulating molten slag bath since their smelting point is low compared with that of the oxides and slags, without having to enter the zone of closer current lines, where they on account of their conductivity in a molten condition would have an unfavourable influence upon the working of the furnace and also would be partly volatilized. The same way of treating metal-forming oxides having a better conductivity than a more slag forming material with or without sulphides and metal-forming oxides will give a similar result and thereby the adding of the slag-forming materials or the mixture of several ores, containing dark and/or light oxides may also be arranged in such a way that the smelting points of the slag-forming parts of the charge will successively fall to the median smelting point of the molten slag bath, whereby a more effective reduction is obtained. If the oxides used, are such more or less volatile, for instance zinc oxide consisting of a certain zinc ore with or without slag forming admixtures and subtances affecting the conductivity of the slag bath, their volatilization will be prevented through a proper manipulation of the reduction process and the effect of a strongly-reducing and gaseous atmosphere in the furnace compartment, thereby continuously approaching the slag-forming parts of the charge to the closer current lines in the proximity of the electrodes.

The sulphidiferous materials stated in the present application comprise, of course, also other sulphurous materials, for instance sulphates, which will form sulphides and enter into the sulphide layer upon being smelted.

In order to further elucidate the invention there is shown on the accompanying drawing diagrammatically as example some forms of construction of a furnace suitable for carrying out the process.

Figure 1 shows in a vertical sectional elevation a furnace intended for carrying out the process.

Figure 2 shows a section of the furnace on lines II—II in Figure 1.

Figure 3 shows in a vertical sectional elevation a form of construction where a common tap hole is provided for the slag layer and the sulphide layer in which figure the left half is indicating the position of the electrode as also that of the smelting bath before the tapping and the right half is showing the position thereof after the tapping.

Figures 4 and 5 show in a similar manner as Figure 3 two other forms of construction.

In the different figures corresponding parts are designated with the same figures of reference.

The invention will first be described with reference to Figure 1.

1 is the brick work of the furnace, 2 the inner furnace room, 3 an electrode descending into said furnace room and adjustably arranged in the height direction, and 4 is indicating a bottom electrode arranged in the furnace. Said electrodes may be arranged in any suitable manner before known so that they may be connected to a source of electric current. The furnace may be open or wholly or partly closed by an arch 5 as indicated with dotted lines. 6 and 6' indicate the charge supplied to the furnace in a known manner, either through the open upper part of the furnace or through openings or channels arranged in a suitable way for the purpose in the arch or top of the furnace in a known manner which need not be described here.

As above indicated the charge when composed of good-conducting materials and bad-conducting materials may be supplied into the furnace room in such a way that the bad-conducting part of the charge 6 will come nearest the adjustable electrode 3 and the better conducting part of the charge 6' nearer the furnace wall, i. e. outside the bad conducting part of the charge. It will also be understood that these bad-conducting parts (6') of the charge may possibly be formed by the original charge when passing through the strongly-reducing, gaseous atmosphere of the furnace compartment: as, for instance, when smelting a certain zinc ore.

7, 8 and 9 show different layers of the smelting bath formed during the process, which on account of their different specific weight form layers one above the other as above stated, whereby the upper layer 7 substantially consists of oxide slag. The layer 8 consists substantially of sulphides and the layer 9 of reduced metal. The limits between the different layers are indicated with unbroken lines 20, 20'. It will, however, be noticed that the layer of sulphide 8 on the one hand in the practice may contain some free metal and on the other hand also some oxide from the oxide layer 7, thus forming a layer of mixture. This layer of mixture between the oxide slag layer proper and the sulphide layer proper as well as the sulphide layer may also, depending upon the composition of the charge, contain varying amounts of compositions of As, and Sb and also phosphorous which compositions have a high conductivity compared with the slag.

10, 11 and 12 indicate channels going through the brick work and serving for the tapping, the outer and inner openings of said channels being arranged at such a level that a desired thickness or height of the different layers will be obtained. By such an arrangement the tapping of the different slag layers or metal layers can thus take place independent of each other.

According to the form of construction shown said tap holes are arranged in such a way that they incline from inside sideways upwards outwards in order to prevent too great variations in the level of the different layers in the tapping.

The bottom of the furnace or part thereof may, as shown in Figure 1, suitably be constructed so as to incline in the direction against that part of the furnace where the tap holes are located.

In the furnace shown in Figure 3, which also may be open or closed in the way shown in Figures 1 and 2, there is shown a way of carrying out the process, where the process is carried out in such a way that the smelting bath forms only two layers, viz. a layer of slag 7 and a sulphide layer 8. As above stated the left part of the figure is showing the position of the electrode 3 as also that of the layers before the tapping, and the right part of the figure shows the position after the tapping. The line 13 shows the limit for free burning electric arcs with the layer of sulphide (short circuit), and the line 14 is showing the limit for free burning electric arcs with the upper surface of the slag bath and the lower surface of the electrode. The line 15 indicates the position of the sulphide layer after the tapping. The tap hole 16 is in this case common for the two layers and arranged in such a way that the sulphide layer first is tapped off to a determined level and thereafter the slag will run off until the upper surface thereof has reached a level corresponding to the upper end of the channel or tap hole 16.

Figure 4 indicates in a similar manner a device for carrying out the process in such a way that the sulphide or the matte is tapped to minimum height through a channel 16 without escape of slag through the discharge channel 17.

Figure 5 illustrates a method of carrying out the process, where the tapping is carried out with small variations in the slag bath. The distance, $hf$, between the upper level of the slag bath before the tapping and the lower point of the electrode is about equal to the distance $hc$, i. e. the difference of level between the upper level of the slag bath after the tapping and the level of the lower point of the electrode after the tapping, whereby the immersion of the electrode into the slag bath will be about constant.

The process may, of course, be carried out also in furnaces having two or more upper electrodes, i. e. from above in the furnace descending electrodes. The charge may be fed into the furnace room in several different ways, for instance by means of feeding screws, blowing in, or in other ways.

It should be obvious that the process or the furnace may be carried out in other ways than that here described and shown on the drawing without departing from the idea of my invention, and that the channels or tap holes, through which the molten mass is drawn off, may be arranged in any suitable way.

In the above given example there has been shown only one upper electrode but it should be self evident that several upper electrodes also may be used. Therefore the expression "electrode" in the following claims comprises also several electrodes.

Having thus described my invention I declare that what I claim is:—

1. Method for smelting sulphidiferous materials in an electric furnace, provided with an adjustable electrode descending into the furnace, which consists in charging the material forming the charge into the electric furnace in such a way that parts of the charge having low electric conductivity are charged into the furnace nearer the electrode than such parts of the charge which have a comparatively higher electric conductivity, said latter parts being charged nearer the furnace walls.

2. Method for smelting a material having parts of high conductivity and parts of low conductivity in an electric furnace, provided with an adjustable electrode descending into the furnace, which consists in roasting the material to be treated, and charging the material into the electric furnace in such a way that parts of the charge having low electric conductivity are charged into the furnace nearer the electrode than such parts of the charge which have a comparatively higher electric conductivity, said latter parts being charged nearer the furnace walls.

3. Method for smelting sulphidiferous materials in an electric furnace, provided with an adjustable electrode descending into the furnace, which consists in supplying the reducing agents to the sulphidiferous material, and charging this material into the electric furnace in such a way that parts of the charge having low electric conductivity are charged into the furnace nearer the electrodes than such parts of the charge which have a comparatively higher electric conductivity, said latter parts being charged nearer the furnace walls.

4. Method for smelting sulphidiferous materials in an electric furnace, provided with an adjustable electrode descending into the furnace, which consists in charging the material forming the charge into the electric furnace in such a way that parts of the charge having low electric conductivity are charged into the furnace nearer the electrode than such parts of the charge which have a comparatively higher electric conductivity, said latter parts being charged nearer the furnace walls, part of the charge containing sulphide being charged farther away from the electrode and materials containing oxides and sulphidiferous material being charged nearer the electrode.

5. Method for smelting sulphidiferous materials in an electric furnace, provided with an adjustable electrode descending into the furnace, which consists in charging the material forming the charge into the electric furnace in such a way that parts of the charge having low electric conductivity are charged into the furnace nearer the electrode than such parts of the charge which have a comparatively higher electric conductivity, said latter parts being charged nearer the furnace walls, part of the charge containing sulphide being charged farther away from the electrode, and materials containing oxides and sulphidiferous material being charged nearer the electrode, slagforming material being added to the material charged adjacent the electrode.

6. Method for smelting sulphidiferous materials in an electric furnace, provided with an adjustable electrode descending into the furnace, which consists in charging the material forming the charge into the electric furnace in such a way that parts of the charge having low electric conductivity are charged into the furnace nearer the electrode than such parts of the charge which have a comparatively higher electric conductivity, said latter parts being charged nearer the furnace walls, material containing sulphide and oxide being charged farther away from the electrode and a more slag forming material containing oxides being charged adjacent the electrode.

7. Method for smelting sulphidiferous materials in an electric furnace, provided with an adjustable electrode descending into the furnace, which consists in charging the material forming the charge into the electric furnace in such a way that parts of the charge having low electric conductivity are charged into the furnace nearer the electrode than such parts of the charge which have a comparatively higher electric conductivity, said latter parts being charged nearer the furnace walls, a material containing sulphides and oxides but forming less slag being charged farther away from the electrode, and an oxidic material containing less sulphide but forming more slag being charged adjacent the electrode.

8. Method for smelting sulphidiferous materials in an electric furnace, provided with an adjustable electrode descending into the furnace, which consists in charging the material forming the charge into the electric furnace in such a way that parts of the charge having low electric conductivity are charged into the furnace nearer the electrode than such parts of the charge which have a comparatively higher electric conductivity, said latter parts being charged nearer the furnace walls, material containing sulphides and oxides but forming less slag being charged farther away from the electrode, and an oxidic material containing less sulphide but forming more slag being charged adjacent the electrode, last mentioned material containing also silicon dioxide.

In testimony whereof I affix my signature.

AXEL RICHARD WEJNARTH.